(12) United States Patent
Carnegie (10) Patent No.: US 8,151,479 B1
(45) Date of Patent: Apr. 10, 2012

(54) TOOLS FOR MEASURING THE LUG PATTERN DIAMETER OF AN AUTOMOTIVE WHEEL

(76) Inventor: Marcus Carnegie, Ponte Vedra Beach, FL (US)

( * ) Notice: Subject to any disclaimer, the term of this patent is extended or adjusted under 35 U.S.C. 154(b) by 178 days.

(21) Appl. No.: 12/778,549

(22) Filed: May 12, 2010

Related U.S. Application Data (60) Provisional application No. 61/177,595, filed on May 12, 2009.

(51) Int. Cl.
*G01B 3/38* (2006.01)
*G01B 5/08* (2006.01)
(52) U.S. Cl. ............... 33/555.2; 33/548; 33/562
(58) Field of Classification Search ............... 33/555.2, 33/548, 562, 563, 565, 567, 407–409, 475, 33/478, 479
See application file for complete search history.

(56) References Cited

U.S. PATENT DOCUMENTS

| | | | | |
|---|---|---|---|---|
| 85,553 | A * | 1/1869 | Adams | 33/472 |
| 1,881,651 | A * | 10/1932 | Judge | 33/562 |
| 3,786,586 | A * | 1/1974 | Swan | 33/563 |
| 5,685,085 | A * | 11/1997 | Bond | 33/555.3 |
| 5,692,861 | A * | 12/1997 | Stottmann | 33/562 |
| 5,749,154 | A * | 5/1998 | Scharf | 33/563 |
| 6,351,893 | B1 * | 3/2002 | St. Pierre | 33/563 |
| 6,405,446 | B1 * | 6/2002 | Monroe | 33/563 |
| 6,647,830 | B2 * | 11/2003 | Marquardt | 81/57.3 |
| 7,412,780 | B2 * | 8/2008 | Holder | 33/562 |
| 7,882,643 | B1 * | 2/2011 | Portinen | 33/474 |
| 2008/0229598 | A1 * | 9/2008 | Liu | 33/562 |

\* cited by examiner

*Primary Examiner* — Yaritza Guadalupe-McCall (57) ABSTRACT

Tools for measuring a lug pattern diameter of an automobile wheel are disclosed. The tools consist of substantially planar devices, each of which includes three sections, a first side that faces a center portion of the wheel, and a second side that faces an exterior portion of the wheel. Each tool further includes two obtuse angles located on the first side of the tool, and a first aperture or mark located in a first section and at least one aperture or mark located in a second section. Each tool further includes a third section located and integrally formed between the first and second section.

19 Claims, 9 Drawing Sheets

TOOLS FOR MEASURING THE LUG PATTERN DIAMETER OF AN AUTOMOTIVE WHEEL

CROSS-REFERENCE TO RELATED APPLICATIONS

This application claims priority to, and incorporates by reference, U.S. provisional patent application Ser. No. 61/177,595, filed May 12, 2009.

FIELD OF THE INVENTION

The field of the present invention relates to tools and methods for measuring the lug pattern diameter of an automobile wheel.

BACKGROUND OF THE INVENTION

Automobile mechanics are often required to measure the lug pattern diameter of an automobile wheel, so that a desired wheel may be affixed to the automobile for repair purposes, routine maintenance, or to replace an existing wheel with a more aesthetically-pleasing wheel. During this procedure, mechanics have used conventional tape measures or, in some instances, complicated and expensive systems to measure the lug pattern diameter of an automobile wheel. These existing devices and methods suffer from various drawbacks, such as being inaccurate, burdensome to use, requiring the purchase of expensive equipment, or are difficult to maneuver around the central hub of a wheel. Accordingly, a need exists for new and improved devices and methods for measuring the lug pattern diameter of an automobile wheel.

SUMMARY OF THE INVENTION

The present invention generally relates to a tool that may be used to measure the lug pattern diameter of an automobile wheel, including wheels for cars, trucks and SUVs. The tool may have several different variations, such as twelve different variations, which may be sold together in a kit. The variations are designed to accommodate a plurality of different lug pattern variables, including the number of lugs that are present in the vehicle (4, 5 or 6), the diameter of the lugs (e.g., 12 or 14 mm; or ½ inch or 9/16 inch), and whether the bolt pattern diameter will be measured in metric or English units.

The invention provides that each tool exhibits a relatively "L"-shaped configuration (although the shape may vary based on the total number of lugs on the wheel hub). A first section of the tool comprises a single aperture through which a first wheel lug is disposed. A second section of the tool includes a plurality of apertures, through which a second lug may be disposed, with each aperture located and labeled to represent an individual lug pattern diameter. As such, the tools described herein may be used by placing the first aperture (located in the first section) over one of the wheel lugs, maneuvering the tool so that a second aperture (located in the opposite second section of the tool) may be placed over a second wheel lug. The lug pattern diameter will be the number immediately adjacent to the second aperture.

The invention provides that tools adapted to accommodate a 5-lug or 6-lug wheel will comprise a plurality of apertures located in a third section of the tool, which is located and integrally formed between the first and second section of the tool. Accordingly, when measuring the lug pattern diameter of a 5-lug or 6-lug wheel, the apertures located in the first, second, and third section of the tool are placed around separate lugs, with the lug pattern diameter being indicated adjacent to the aperture located in the second section of the tool.

According to certain additional, preferred embodiments of the invention, a set of tools are provided that may be used to measure the lug pattern diameter of an automobile wheel, which do not include any apertures for receiving a lug of the wheel. More specifically, similar to the other embodiments described herein, the tools consist of a substantially planar "L-shaped" device having three sections, with a first side that faces a center portion of the wheel, a second side that faces an exterior portion of the wheel (with two obtuse angles located on the first side of the tool). According to such embodiments, a first mark is located in a first section and at least one mark is located in a second section (although the second section will preferably include a plurality of different marks as described herein), with a third section being disposed and integrally formed between the first and second section. The invention provides that the first mark of the tool is then placed over a first lug, and a second mark is placed over a second lug. After the tool is positioned in this manner, the lug pattern diameter will be the number indicated adjacent to the second mark. According to these embodiments, the tools are preferably transparent, in order to facilitate the positioning of the tools (first and second marks thereof) over the center of the first and second lugs.

In addition to the tools described above, the present invention further encompasses methods of measuring the lug pattern diameter of an automobile wheel, using the tools described herein. Still further, the present invention comprises kits that contain a plurality of the tools described herein which, collectively, may be used to measure the lug pattern diameter of a 4-lug, 5-lug, or 6-lug automobile wheel.

The above-mentioned and additional features of the present invention are further illustrated in the Detailed Description contained herein.

DETAILED DESCRIPTION OF THE INVENTION

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-4, according to certain preferred embodiments of the present invention, tools are provided which comprise substantially planar devices, each of which includes a first section 10, a second section 12, and a third section 14. In addition, the tools of the present invention comprise a first side 24 that faces a center portion 42 (FIG. 4) of the wheel, and a second side 26 that faces an exterior portion of the wheel. Each tool further includes two obtuse angles 20,22 located on the first side 24 of the tool, and a first aperture 16 located in the first section 10 of the tool and at least one aperture 18 located in the second section 12 of the tool. Each tool further includes a third section 14 located and integrally formed between the first 10 and second section 12. The two obtuse angles 20,22 located on the first side 24 of the tool impart a relatively "L"-shaped configuration or bend, which allows the tool to measure the lug pattern diameter of the wheel, while avoiding any interference with the central hub of the wheel.

Figure 3:
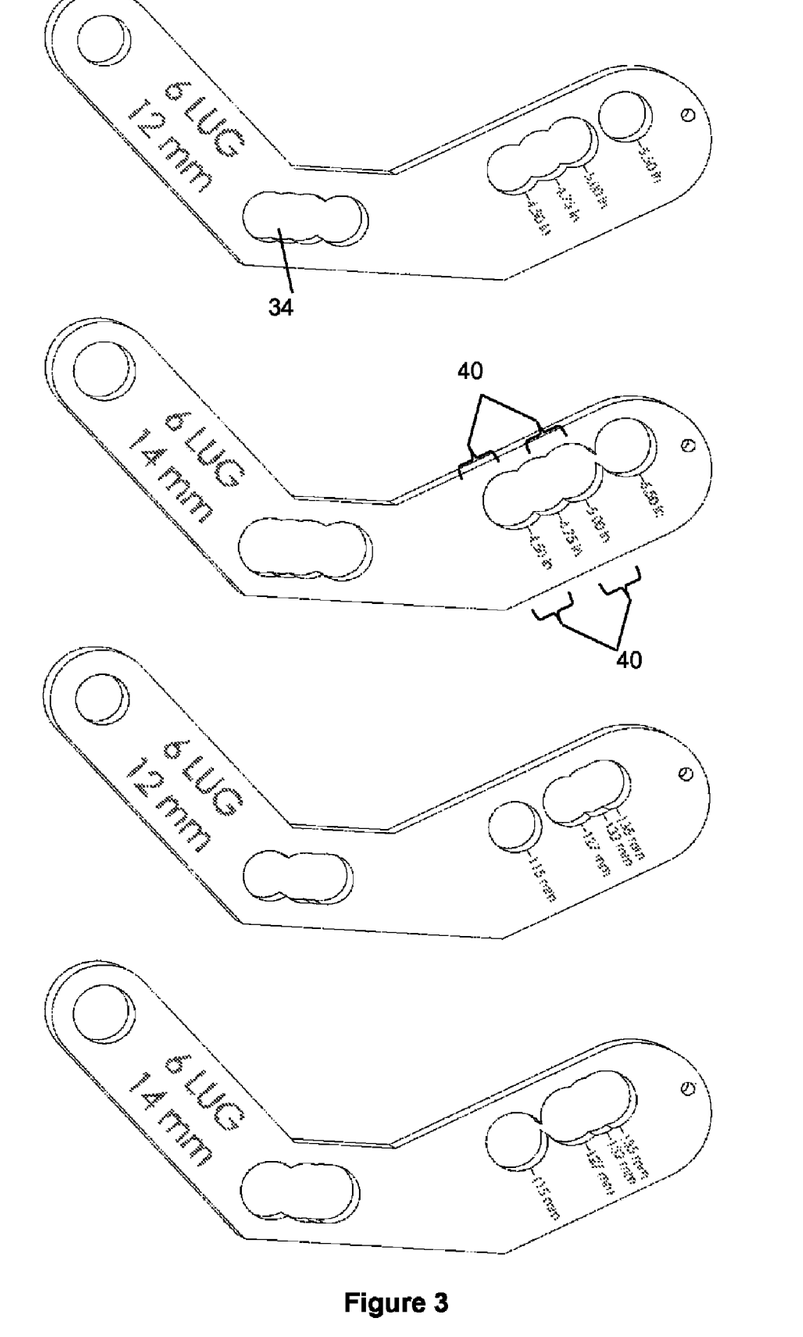
FIG. 3 is a drawing of a set of tools adapted to accommodate a 6-lug automobile wheel.
Figure 4:
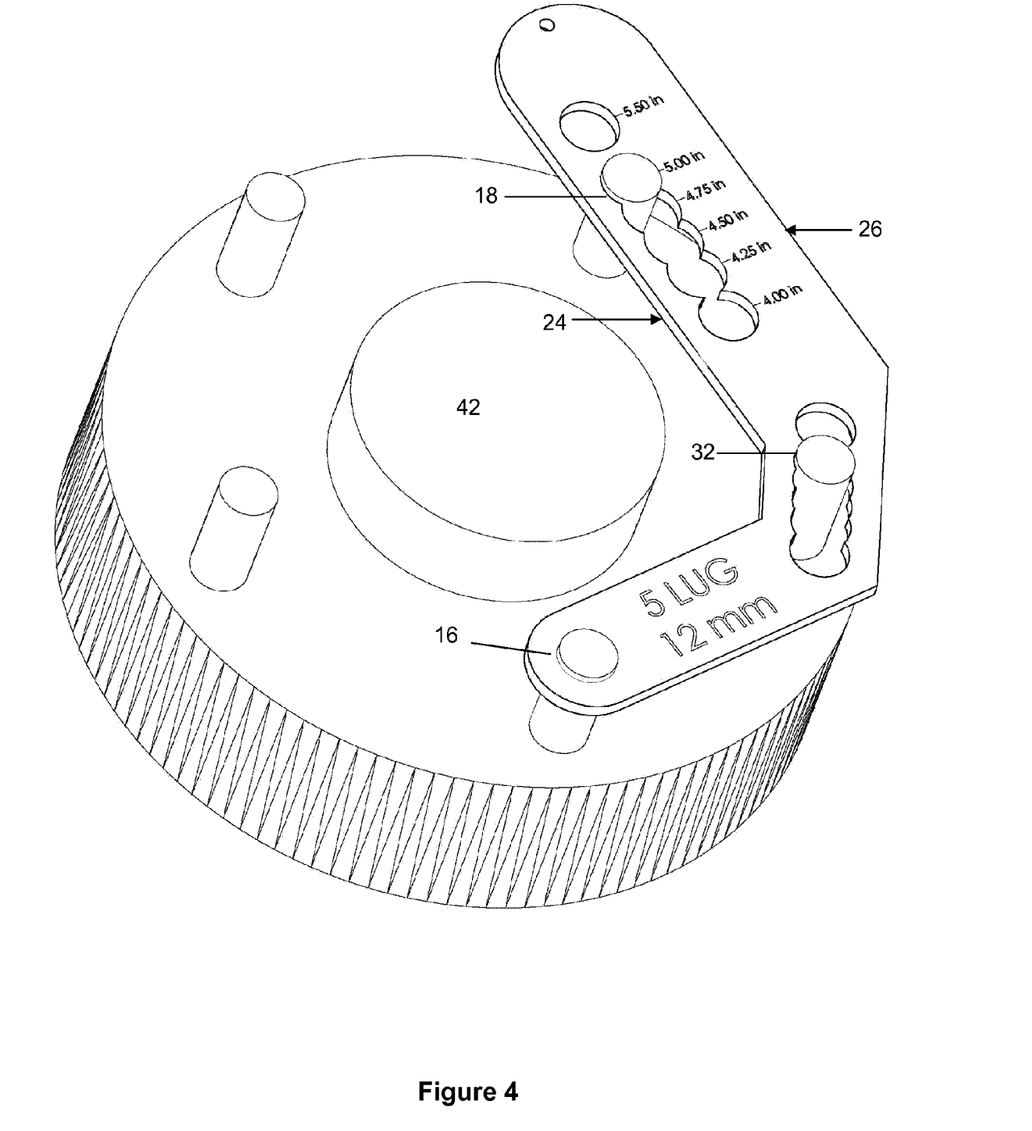
FIG. 4 is a drawing of a tool described herein being applied to a 5-lug automobile wheel.

According to certain embodiments of the present invention, at least one aperture 18 located in the second section 12 comprises a plurality of apertures located along an axis 28 (FIG. 2) thereof. According to such embodiments, the first section 10 comprises only a single aperture 16, whereas at least a portion of the plurality of apertures located along the axis 28 of the second section 12 are contiguously formed with each other. The invention provides that the contiguously formed apertures 18 comprise a top and bottom arc 40 (FIG. 3) which separates each aperture thereof, with each top and bottom arc 40 being capable of receiving a lug of a wheel. The invention provides that each of the plurality of apertures 18 located along the axis 28 of the second section 12 is correlated with a specific lug pattern diameter of the wheel, and each such diameter reading is numerically indicated 36 adjacent to each of the plurality of apertures 18 located in the second section 12 of each tool (and the diameter may be measured in metric and/or English units). As such, when the tool is applied to a wheel (as shown in FIG. 4), the numerically indicated 36 diameter adjacent to each of the plurality of apertures 18 located in the second section 12 of the tool corresponds to the distance between the first aperture 16 and second aperture 18. For example, referring to FIG. 2, if the tool shown therein is applied to a 5-lug wheel, with the first aperture 16 and second aperture 18-1 each receiving a wheel lug, the distance 44 will represent the lug pattern diameter that is indicated immediately adjacent to aperture 18-1. Similarly, if the tool shown therein is applied to a 5-lug wheel, with the first aperture 16 and second aperture 18-2 each receiving a wheel lug, the distance 46 will represent the lug pattern diameter that is indicated immediately adjacent to aperture 18-2.

Figure 1:
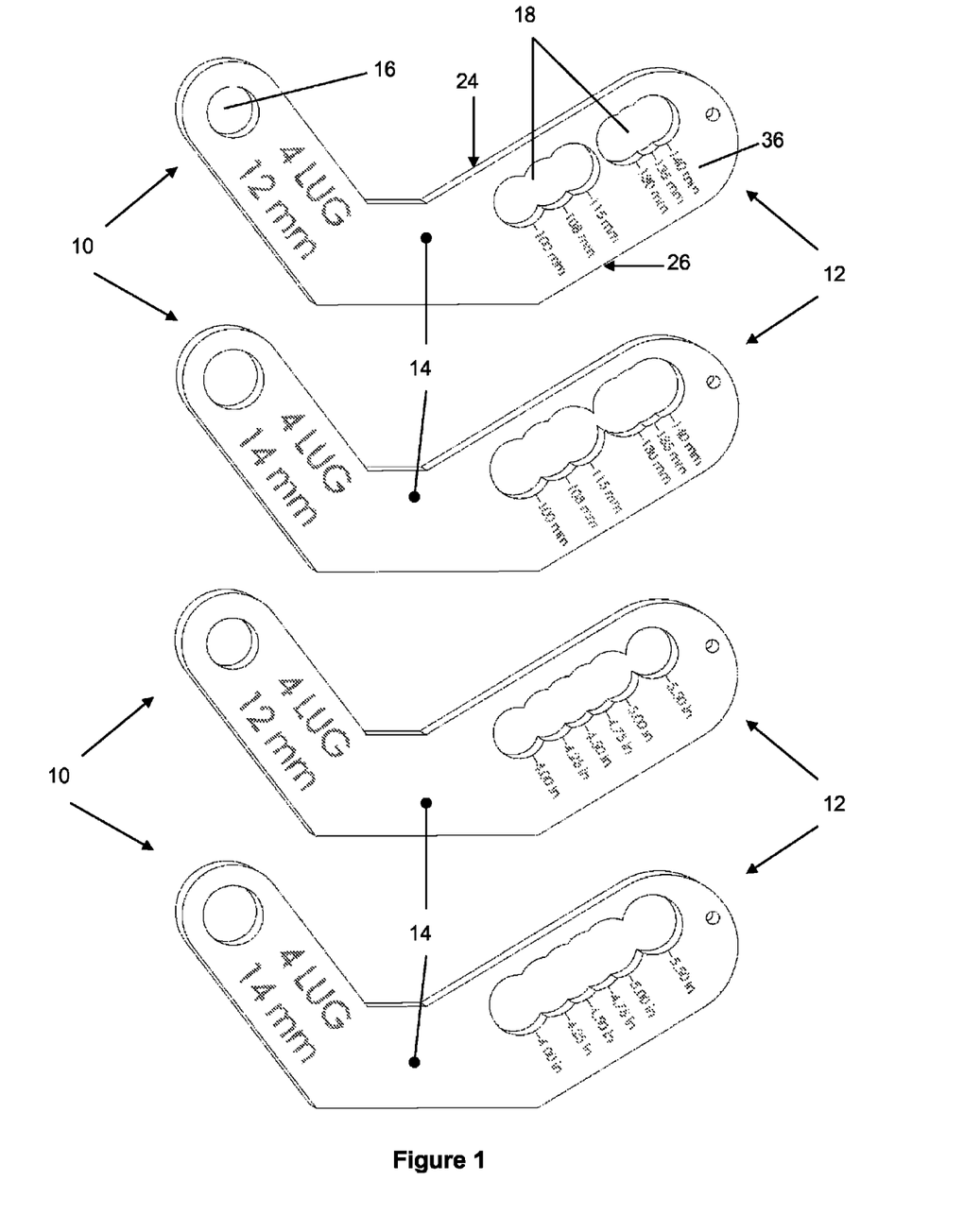
FIG. 1 is a drawing of a set of tools adapted to accommodate a 4-lug automobile wheel.
Figure 2:
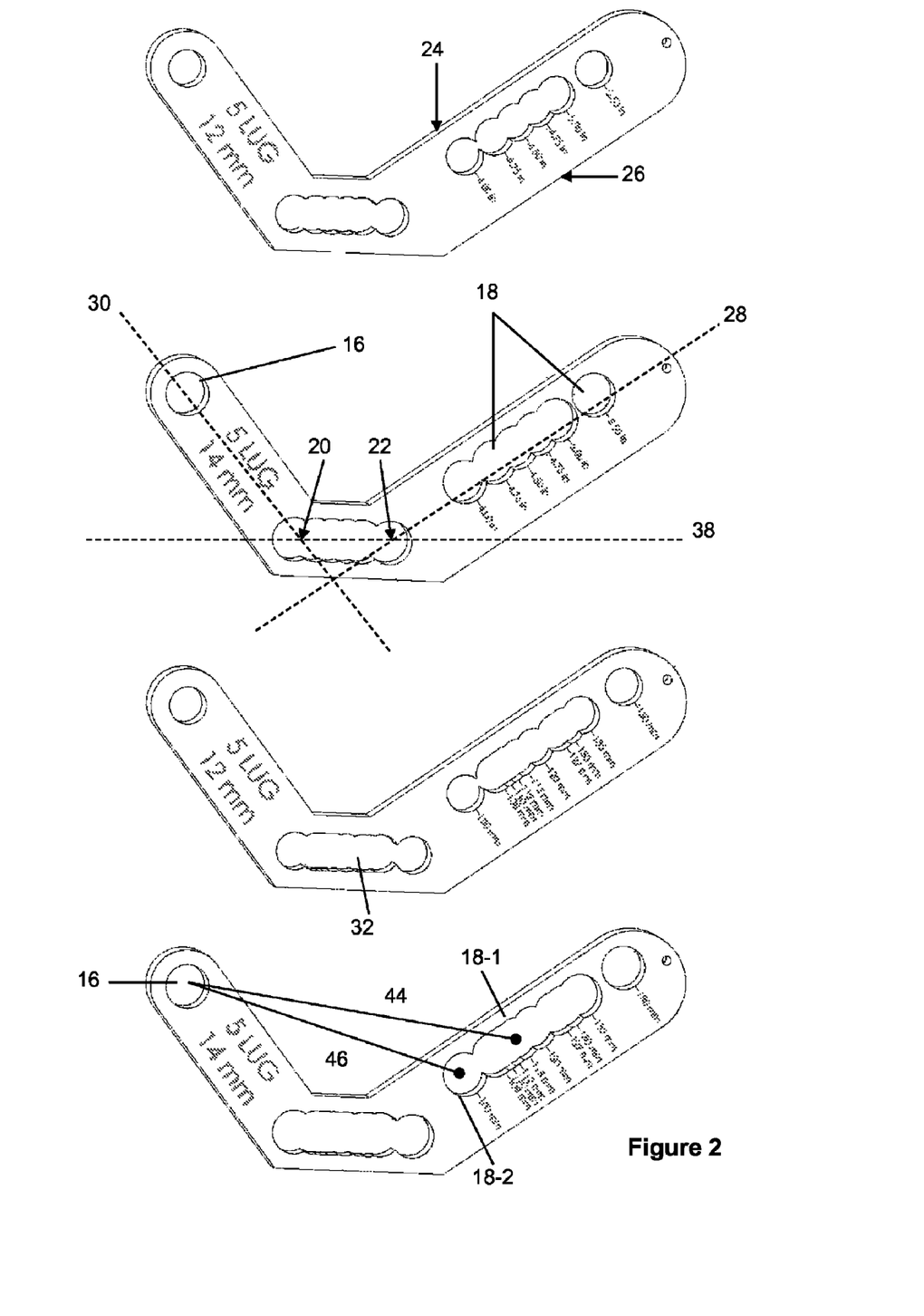
FIG. 2 is a drawing of a set of tools adapted to accommodate a 5-lug automobile wheel.

As illustrated in FIG. 1, the invention provides that the third section 14 of a tool, which is adapted for a 4-lug wheel, preferably does not comprise any apertures. As illustrated in FIGS. 2-3, the third section 14 of a tool which is adapted for a 5-lug or 6-lug wheel preferably does comprise a plurality of apertures 32 (FIG. 2) and 34 (FIG. 3), respectively. As described above relative to at least a portion of the plurality of apertures 18 located along the axis 28 of the second section 12, the plurality of apertures 32 (FIG. 2) and 34 (FIG. 3) located along the axis 38 of the third section 14, for tools adapted to measure the lug pattern diameter of 5-lug or 6-lug wheels, are contiguously formed with each other. Also as described above, the contiguously formed apertures 32,34 of the third section 14 include a top and bottom arc 40 which separate each aperture thereof. As illustrated in FIGS. 1-4, in addition to being able to accommodate and measure the lug pattern diameter of 4-, 5-, and 6-lug wheels, the tools of the present invention may further be adapted to accommodate lugs of different diameters, such as 12 or 14 mm diameter lugs (or ½ inch or 9/16 inch).

Figure 5:
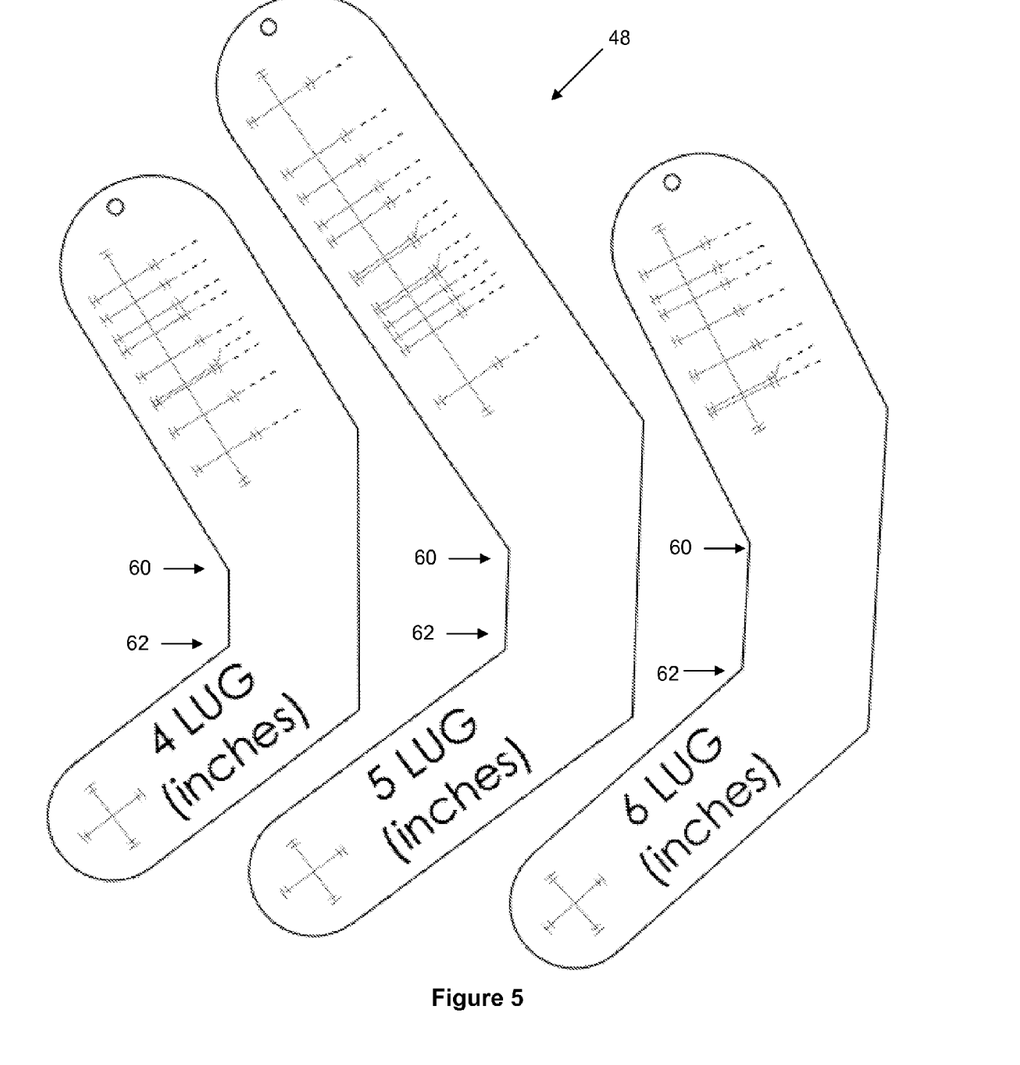
FIG. 5 is a drawing of another preferred embodiment of a set of tools described herein, which may be used to measure the lug pattern diameter of an automobile wheel.
Figure 6:
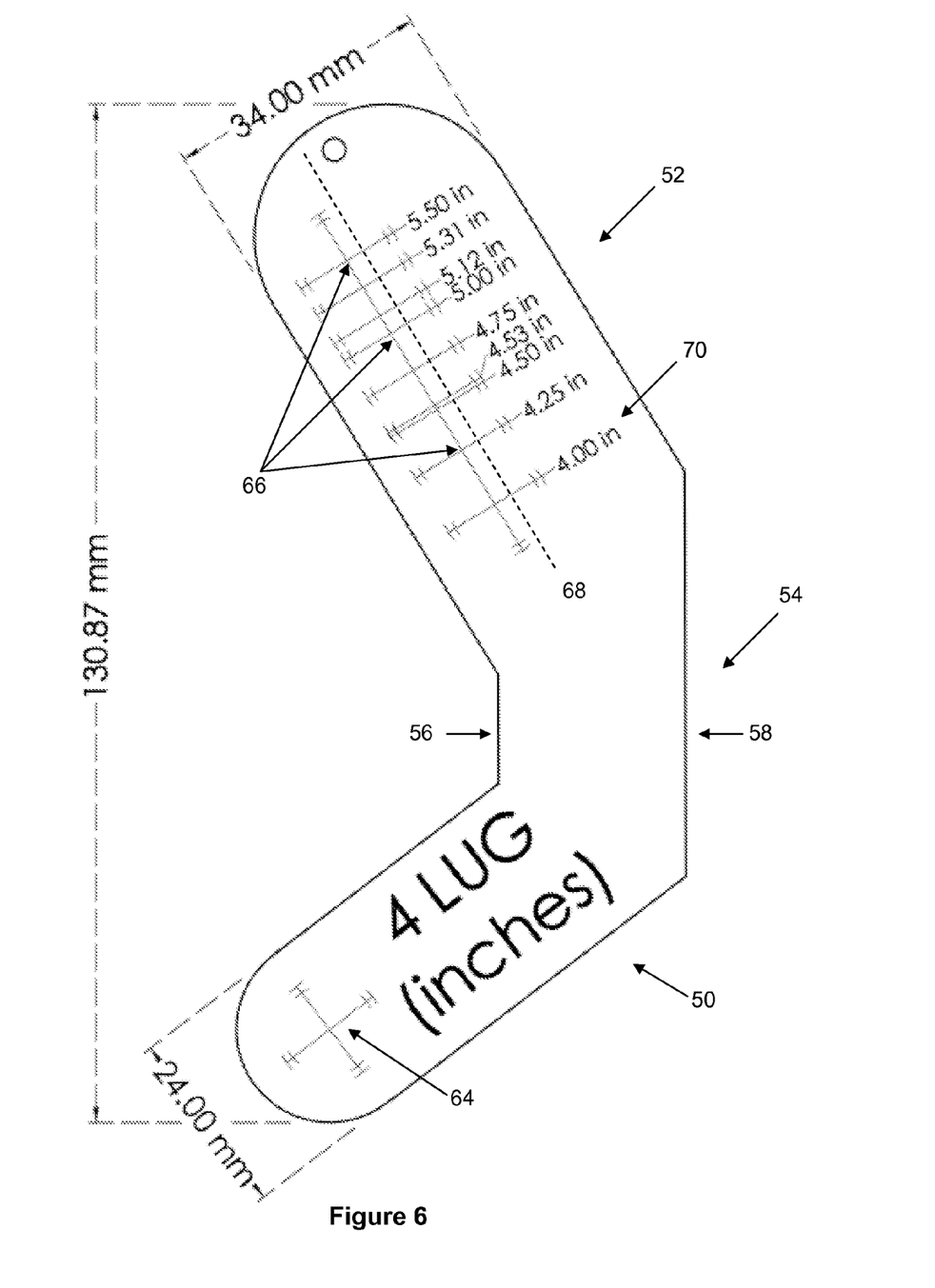
FIG. 6 is a drawing of a tool shown in FIG. 5, which is adapted to accommodate a 4-lug automobile wheel.
Figure 7:
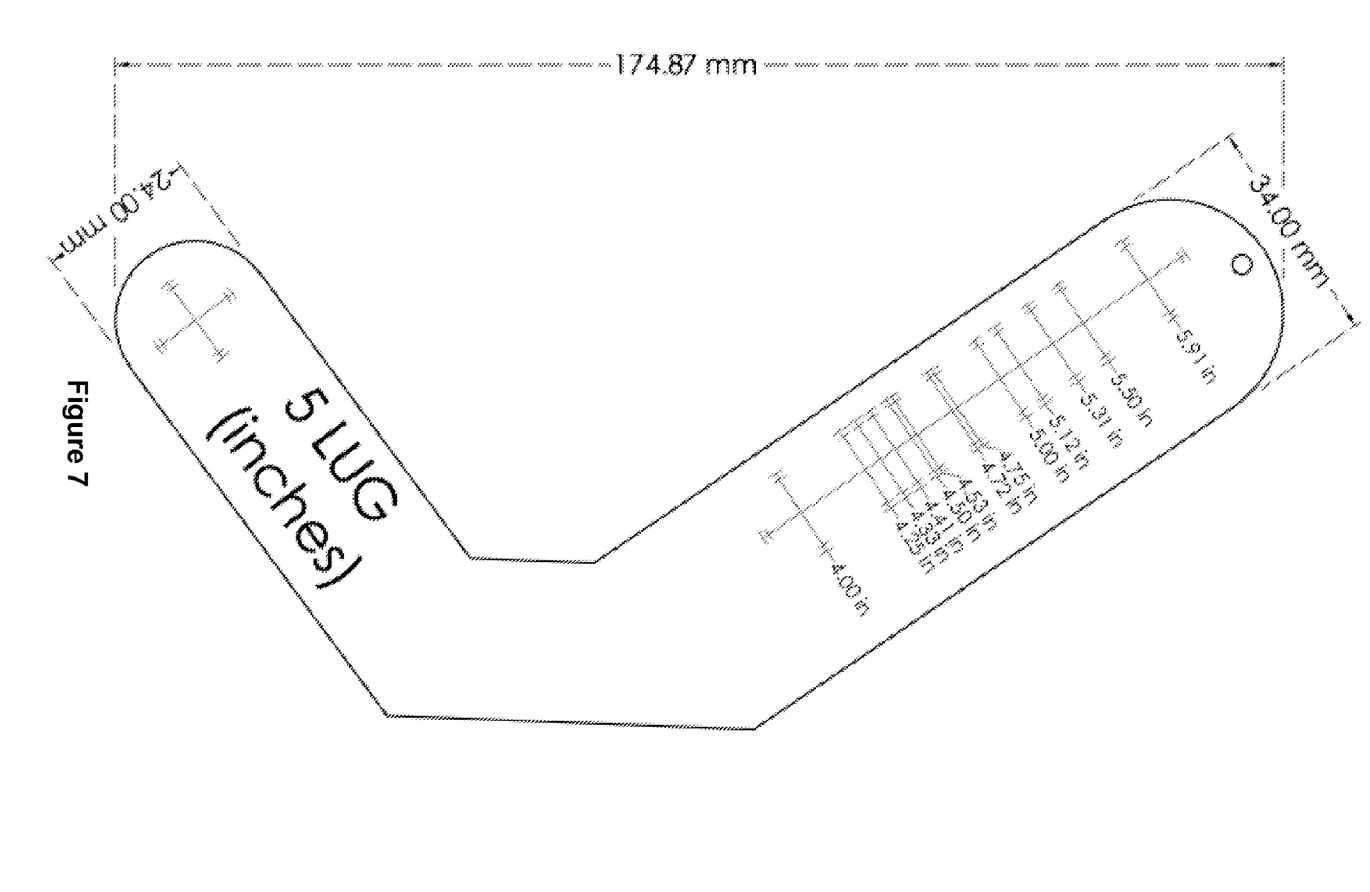
FIG. 7 is a drawing of a tool shown in FIG. 5, which is adapted to accommodate a 5-lug automobile wheel.
Figure 8:
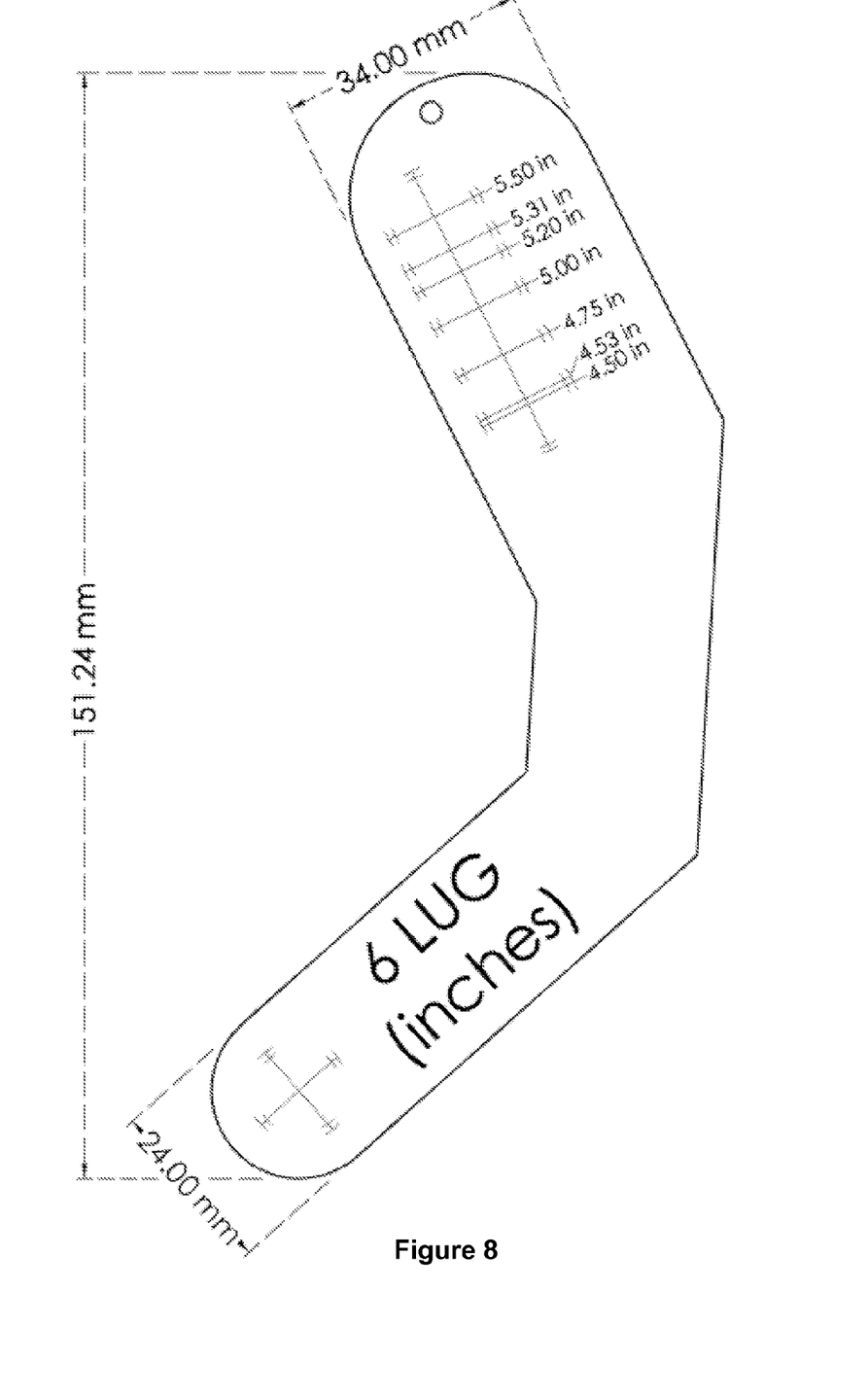
FIG. 8 is a drawing of a tool shown in FIG. 5, which is adapted to accommodate a 6-lug automobile wheel.

In addition to the foregoing, the invention provides certain additional tools 48 and methods for measuring the lug pattern diameter of an automobile wheel. According to such embodiments, and referring now to FIGS. 5-9, such tools also comprise substantially planar devices, each of which includes a first section 50, a second section 52, and a third section 54 (FIG. 6). In addition, the tools of the present invention comprise a first side 56 that faces a center portion of the wheel, and a second side 58 that faces an exterior portion of the wheel. Each tool further includes two obtuse angles 60,62 (FIG. 5) located on the first side 56 of the tool. The tools further comprise a first mark 64, such as a cross-mark, located in the first section 50 of the tool and at least one mark 66 located in the second section 52 of the tool and, more preferably, will comprise a plurality of marks 66 located in the second section 52 of the tool. Each tool further includes a third section 54 located and integrally formed between the first 50 and second section 52. The two obtuse angles 60,62 located on the first side 56 of the tool imparts a relatively "L"-shaped configuration or bend, as with the other embodiments described herein, which allows the tool to measure the lug pattern diameter of the wheel, while avoiding any interference with the central hub of the wheel.

Figure 9:
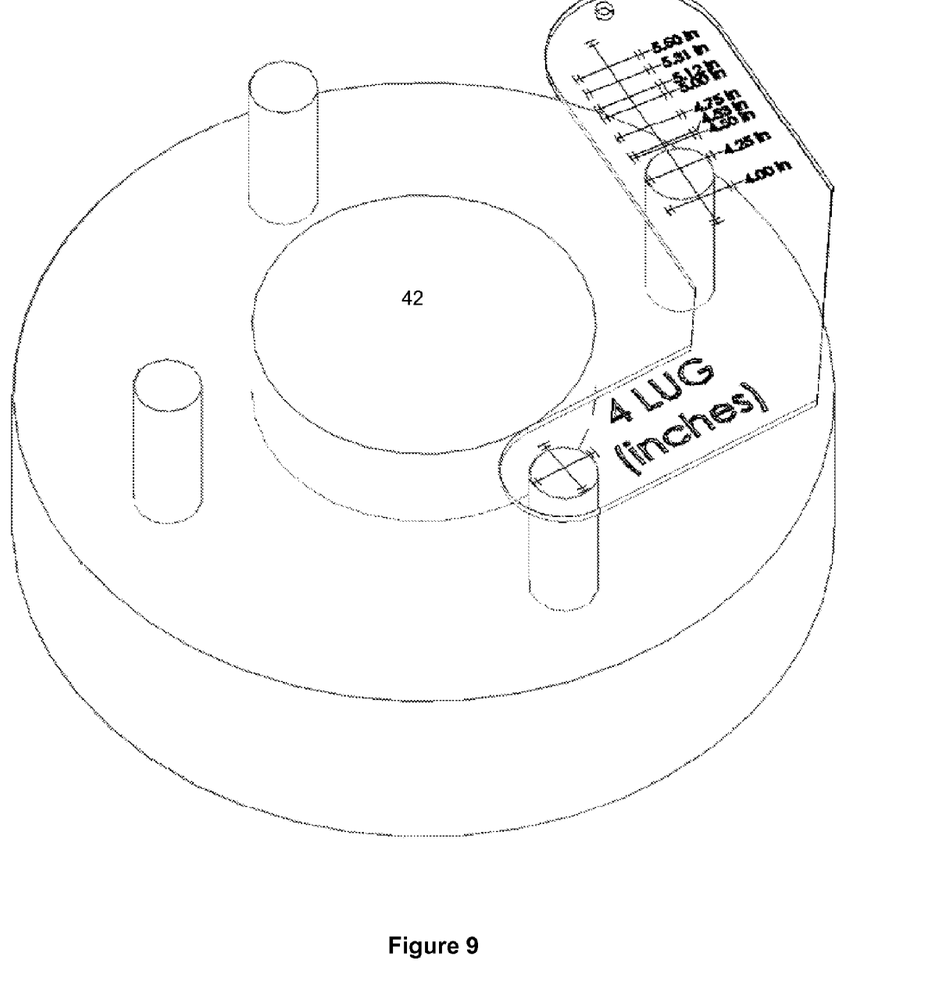
FIG. 9 is a drawing of a tool shown in FIG. 5, which is being applied to an automobile wheel.

According to such embodiments of the present invention, as explained above, a plurality of marks 66 will preferably be located in the second section 52, along an axis 68 thereof, whereas the first section 50 will comprise only a single mark 64. The invention provides that each of the plurality of marks 66 located along the axis 68 of the second section 52 is correlated with a specific lug pattern diameter of the wheel, and each such diameter reading is numerically indicated 70 adjacent to each of the plurality of marks 66 located in the second section 52 of each tool (and the diameter may be measured in metric and/or English units). As such, when the tool is applied to a wheel, the numerically indicated 70 diameter adjacent to each of the plurality of marks 66 located in the second section 52 of the tool corresponds to the distance between the first mark 64 and second mark 66. For example, referring to FIG. 6, if the tool shown therein is applied to a 4-lug wheel, with the first mark 64 being placed directly over a first wheel lug, and one of the plurality of second marks 66 being located over a second wheel lug (of the same wheel), the distance 70 will represent the lug pattern diameter of the wheel. Referring to FIG. 9, the invention provides that the tools will preferably be comprised of a transparent material, such as a transparent plastic, such that the tools may be positioned over the lugs of a wheel, and the first 64 and second marks 66 described herein (of the first 50 and second 52 sections, respectively), may be precisely centered over the lugs.

As illustrated in FIGS. 5-9, according to these embodiments, the invention provides that the third section 54 of a tool may not comprise any apertures, unlike the other embodiments described herein. The invention provides that in addition to being able to accommodate and measure the lug pattern diameter of 4-, 5-, and 6-lug wheels, the tools of the present invention may further be adapted to accommodate lugs of different diameters, such as 12 or 14 mm diameter lugs (or ½ inch or 9/16 inch).

According to additional embodiments of the invention, kits are provided for measuring a lug pattern diameter of an automobile wheel. The kits generally comprise a plurality of the tools described herein, which are collectively adapted to measure the lug pattern diameter for a 4-lug, 5-lug or 6-lug wheel. The plurality of tools are preferably packaged together, which may further include instructions for using the tools. According to certain alternative embodiments, however, the tools may be sold separately, instead of co-packaged together. The tools described herein, including those packaged together in a kit, may be comprised of plastics, steel, or other preferably affordable and durable materials. As explained above, in the case of the embodiments shown in FIGS. 5-9, the tools will preferably be comprised of a transparent material, such as a transparent plastic, e.g., polystyrenes, polypropylenes, etc.

According to other preferred embodiments of the present invention, methods for measuring a lug pattern diameter of an automobile wheel are provided, which employ the use of the tools and kits described herein. For example, the methods of the present invention generally comprise providing a plurality of substantially planar devices, each of which includes (i) a first 10, second 12, and third 14 section, (ii) a first side 24 that faces a center portion 42 of the wheel, (iii) a second side 26 that faces an exterior portion of the wheel, and (iv) two obtuse angles 20,22 located on the first side of the tool. The methods include determining whether the automobile wheel is a 4-lug, 5-lug or 6-lug wheel (and the diameter of the lugs, such as 12 or 14 mm lugs) and then selecting a tool (one of the substantially planar devices) that is adapted to measure the lug pattern diameter of the 4-lug, 5-lug or 6-lug wheel—and will accommodate the specific diameter of the lugs.

The methods further comprise placing a first aperture 16 located in a first section 10 of the tool around a first wheel lug. The methods further comprise placing a second aperture 18 located in the second section 12 around a second lug. As described herein, the methods further include reading a lug pattern diameter number 36 of the wheel, which is indicated adjacent to the second aperture 18 of the second section 12 through which the lug is disposed. An illustration of a tool adapted to measure the lug pattern diameter of a 5-lug wheel is shown in FIG. 4.

Although certain example methods, apparatus, and/or articles of manufacture have been described herein, the scope of coverage of this disclosure is not limited thereto. On the contrary, this disclosure covers all methods, apparatus, and/or articles of manufacture fairly falling within the scope of the appended claims either literally or under the doctrine of equivalents.

What is claimed is:

1. A tool for measuring a lug pattern diameter of an automobile wheel, which comprises:
    (a) a substantially planar device comprising three sections, a first side that faces a center portion of the wheel, and a second side that faces an exterior portion of the wheel;
    (b) two obtuse angles located on the first side of the tool; and
    (c) a first aperture or mark located in a first section and at least one aperture or mark located in a second section, wherein a third section is disposed and integrally formed between the first and second section.

2. The tool of claim 1, wherein the second section comprises a plurality of apertures or marks located along an axis thereof, whereas the first section comprises only a single aperture or mark.

3. The tool of claim 2, wherein at least a portion of the plurality of apertures located along the axis of the second section are contiguously formed with each other.

4. The tool of claim 3, wherein the contiguously formed apertures comprise a top and bottom arc which separates each aperture thereof.

5. The tool of claim 2, wherein each of the plurality of apertures or marks located along the axis of the second section is correlated with a specific lug pattern diameter of the wheel.

6. The tool of claim 5, wherein the third section of the tool does not comprise any apertures and is adapted for a 4-lug wheel.

7. The tool of claim 2, wherein the third section comprises a plurality of apertures located along an axis thereof.

8. The tool of claim 7, wherein the tool is adapted for a 5-lug or 6-lug wheel.

9. The tool of claim 8, wherein at least a portion of the plurality of apertures located along the axis of the second and third section are contiguously formed with each other.

10. The tool of claim 9, wherein the contiguously formed apertures comprise a top and bottom arc which separates each aperture thereof.

11. The tool of claim 10, wherein each of the plurality of apertures located along the axis of the second section is correlated with a specific lug pattern diameter of the wheel.

12. A method for measuring a lug pattern diameter of an automobile wheel, which comprises:
    (a) providing a substantially planar device comprising (i) three sections, (ii) a first side that faces a center portion of the wheel, (iii) a second side that faces an exterior portion of the wheel, and (iv) two obtuse angles located on the first side of the tool;
    (b) placing a first aperture or mark located in a first section of the tool around or on top of a first wheel lug;
    (c) placing a second aperture or mark located in a second section around or on top of a second lug, wherein a third section of the tool is disposed and integrally formed between the first and second section; and
    (d) reading a lug pattern diameter of the wheel, which is indicated adjacent to the second aperture or mark placed around or on top of the second lug.

13. The method of claim 12, which further comprises determining whether the wheel is a 4-lug, 5-lug or 6-lug wheel and selecting a tool adapted to measure the lug pattern diameter of the 4-lug, 5-lug or 6-lug wheel.

14. A kit for measuring a lug pattern diameter of an automobile wheel, which comprises a plurality of separate tools that are collectively adapted to measure the lug pattern diameter for a 4-lug, 5-lug or 6-lug wheel, wherein each tool comprises:
    (a) a substantially planar device comprising three sections, a first side that faces a center portion of the wheel, and a second side that faces an exterior portion of the wheel;
    (b) two obtuse angles located on the first side of the tool; and
    (c) a first aperture or mark located in a first section and at least one aperture or mark located in a second section, wherein a third section is disposed and integrally formed between the first and second section.

15. The kit of claim 14, wherein the second section of each tool comprises a plurality of apertures or marks located along an axis thereof, whereas the first section comprises only a single aperture or mark.

16. The kit of claim 15, wherein at least a portion of the plurality of apertures located along the axis of the second section of each tool are contiguously formed with each other.

17. The kit of claim 16, wherein the contiguously formed apertures comprise a top and bottom arc which separates each aperture thereof.

18. The kit of claim 15, wherein each of the plurality of apertures or marks located along the axis of the second section of each tool is correlated with a specific lug pattern diameter of the wheel.

19. The kit of claim 18, wherein:
(a) a portion of the tools are adapted for a 4-lug wheel and do not include any apertures located in the third section thereof;
(b) a portion of the tools are adapted for a 5-lug wheel and do not include a plurality of apertures located in the third section thereof; and
(c) a portion of the tools are adapted for a 6-lug wheel and do not include a plurality of apertures located in the third section thereof.

* * * * *